United States Patent
Walsh et al.

[11] Patent Number: 5,842,839
[45] Date of Patent: Dec. 1, 1998

[54] LIQUID SUPPLY SYSTEM

[76] Inventors: Roger C. Walsh, Box 1529, Brighton Ont, Canada, K0K 1H0; Douglas W. Eggins, 129 Daphne Crescent, Barrie, Ont., Canada, L4M 2Y7

[21] Appl. No.: 502,431

[22] Filed: Jul. 14, 1995

Related U.S. Application Data

[63] Continuation-in-part of Ser. No. 209,981, Mar. 11, 1994, Pat. No. 5,445,356, and Ser. No. 365,734, Dec. 29, 1994.

[51] Int. Cl.$^6$ .............................. F04B 17/00; F04B 43/08
[52] U.S. Cl. ........................... 417/379; 417/392; 417/46; 417/478
[58] Field of Search ................................. 417/478, 475, 417/375, 379, 521, 531, 392, 393, 395, 46

[56] References Cited

U.S. PATENT DOCUMENTS

| | | | |
|---|---|---|---|
| 2,760,436 | 8/1956 | Seggern | 417/390 |
| 3,007,416 | 11/1961 | Childs | 417/383 |
| 3,048,121 | 8/1962 | Sheesley | 417/394 |
| 3,250,226 | 5/1966 | Voelker | 417/339 |
| 3,359,916 | 12/1967 | Houston et al. | 417/392 |
| 3,417,707 | 12/1968 | Zimmer | 417/475 |
| 3,626,985 | 12/1971 | Erickson | 138/115 |
| 4,662,829 | 5/1987 | Nehring | 417/395 |
| 5,014,731 | 5/1991 | Westerberg | 137/59 |

*Primary Examiner*—Timothy Thorpe
*Assistant Examiner*—Peter G. Korytnyk
*Attorney, Agent, or Firm*—D. W. Eggins; Douglas Eggins

[57] ABSTRACT

A liquid transfer system for liquids that are subject to solidification uses a pipeline, with compressed gas as the liquid displacement medium. The pipeline comprises a substantially rigid outer line and a flexible inner hose, forming with the outer line an intermediate interstitial zone along the inner hose; a check valve located adjacent each end of the inner hose provides uni-directional flow within the system. A gas compressor connected with the interstitial zone by way of a flow control selectively applies pressurized gas or vacuum to the zone. The three possible phases of operation comprise; a first phase, when vacuum is applied to the interstitial zone, to expand the inner hose and induce liquid from the source to substantially fill the inner hose; a second phase when gas pressure is applied to the interstitial zone, to compress the inner hose and expel the liquid toward the point of delivery. The first and second phases are repeatable, to provide cumulative delivery of the liquid. In the third phase, gas pressure is maintained within the interstitial zone to maintain the inner hose collapsed and substantially "dry" so as to prevent "freezing" within the inner hose. A second such pipeline adjoining the first pipeline, working in opposite phased relation, enables substantially continuous flow. The third, purging phase of operation is applied co-extensively to both the pipe-lines. The system can utilize interstitial gas to assist the prime mover on start-up. Liquids other than water can be pumped.

10 Claims, 1 Drawing Sheet

LIQUID SUPPLY SYSTEM

This application is a Continuation-in-Part of application Ser. No. 08/209,981 filed Mar. 11, 1994, now U.S. Pat. No. 5,445,356 and pending application Ser. No. 08/365,734, filed Dec. 29, 1994, now allowed which are incorporated herein by reference.

TECHNICAL FIELD

This invention is directed to a pipeline system, for the transfer of liquids that are subject to solidification such as freezing in the system. Compressed gas is used as the actuating fluid.

BACKGROUND ART

Certain aspects of the present invention, insofar as it is applied to the dewatering of pipes in order to prevent freeze-up, are related to the system disclosed in Canadian Patent No. 1,122,877, Gauthier, May 1982. Another system using air pressure in combination with a hose is by Erickson, U.S. Pat. No. 3,626,985 December 1971. This system is intended and suited for high flow rate agricultural systems with large diameter pipes, for operation in temperate climates. Erickson employs a collapsible inner hose within his large diameter irrigation pipe, using air from an air tank to collapse the inner hose, and perforated drain tubes to ensure full liquid removal, to lighten the pipes and facilitate system relocation.

The persistence of the problems of water system pipe freeze-up appears evident from U.S. Pat. No. 5,014,731 May 1991, which employs an over-pressure responsive drain valve that is actuated by over-pressure generated by the anomalous increase in the specific volume of water when the temperature thereof drops below four degrees Fahrenheit, just prior to freeze-up taking place. The drain valve has a time delay, permitting line drainage, followed by valve closure and replacement flow of warmer water, to refill the system.

Canadian Patent No. 814,792 Cronin, June 1969 shows the use of an expansible rubber pipe within a rigid conduit, for transferring air-borne particulate material. Increased air pressure swells the inner pipe, to dislodge particulate material coated on to the inner surface of the expansible pipe, thus permitting it to be blown clear.

U.S. Pat. No. 4,662,829 May 1987, discloses an air-driven pump having an air-differential pressure chamber and an adjoining pumping chamber. The air chamber includes a mechanically displaced venting valve to cause cyclic operation of the system. The air chamber operates with either positive applied air pressure, or with negative pressure (suction).

In the case of avoiding waterline freeze-up, the two prior water displacement systems, of Erickson and Gauthier, do not appear to have become commercially viable, as the most widely used system at present appears to be that employing an electrically heated cable, such as that of the Heat-Line Corporation, or the Pyrotennax™ system. The latter system presently has a cost of about $39 per meter ($12 per foot), and with rather high associated running costs for the required electrical current consumption, at about 22-watts per meter, (7-watts per foot) when active, such that annual energy costs of several hundred dollars readily arise.

One of the problems that has occurred with the above referred-to Gauthier system, which may well have limited its commercial success, is the need to thread the inner hose manually through the outer hose; also, the failure of its flexible-walled inner hose, where it secures to the end fitting. In use upon repeated cycles of collapse and expansion, the thick-walled Gauthier hose fails in tension. Gauthier relies upon the inherent self-restoring tendency of a thick-walled gum-rubber hose both to expand diametrically under pumping pressures, and to contract subsequently, upon cessation of pumping, so as to provide significant dewatering of the hose on depressurization of the hose.

This effect is assisted with the application of air pressure, from a residual air cushion surrounding the hose. One imperative aspect of any practical system is its suitability for installation and operation by substantially unskilled help.

DISCLOSURE OF INVENTION

The present invention provides a liquid transfer system, connecting a liquid source to a liquid delivery point, the system comprising: at lest one pipeline having a substantially rigid outer line and a flexible inner hose, forming with the outer line an intermediate interstitial zone along the inner hose; a check valve locate adjacent each end of the inner hose to ensure uni-directional liquid flow within the inner hose; gas pressurizing means connected with the interstitial zone by way of flow control means, to selectively provide a source of gas under pressure and a source of vacuum to the zone; the flow control means having three phases of operation; a first phase wherein, in use, the vacuum source is connected to the interstitial zone, to expand the inner hose and induce flow of the liquid from the source to substantially fill at least a major portion of the inner hose; a second phase wherein the gas pressure source is connected to the interstitial zone, to supply gas under pressure to compress the inner hose and expel the liquid therein toward the point of delivery, the first and second phases being repeatable, to provide delivery of a substantial quantity of the liquid; and a third phase, wherein the gas pressure is maintained within the interstitial zone to maintain the inner hose compressed and substantially free of the liquid. The system may include a second like pipeline adjoining the above described pipeline, to transfer the liquid from the source to the delivery point. The second pipeline having the gas pressurizing means connected to its interstitial space by way of the flow control means, the flow control means sequentially applying vacuum and gas pressure to the second interstitial space in oppositely phased relation to that of the first pipeline for the first and second phases of operation. In the third phase of operation pressure is applied, to act co-extensively on the first and the second pipelines.

In the above described system the gas pressurizing means may comprise a prime mover connected in driving relation with a gas compressor, the gas compressor having a gas inlet and a gas outlet. The flow control means may be connected in controlling relation with a line connecting the pipeline interstitial space to the inlet of the gas compressor, in use to admit pressurized gas from the interstitial space to the gas inlet of the compressor, in driving relation with the compressor and its prime mover, so as to assist the prime mover in state-up thereof when providing respective phases of system operation. The system gas pressurizing means preferably includes at least one pressure tank to contain the gas at a pressure other than atmospheric.

Preferably the system includes two such pressure tanks, one containing the gas at pressures above atmospheric, the other to contain the gas at pressures below atmospheric, i.e. substantially at vacuum.

The system in most instances can operate with air as the pressurized gas.

In another embodiment, an ostensibly single hose line may have a longitudinally extending, transverse partition diaphragm, that can lie against one portion of the inner surface of the hose, or can reverse its curvature, to lie against the opposed inner surface of the hose, in response to changes of gas pressure within the hose. Thus, a large volume liquid passage or a separated, large volume gas chamber is provided within the outer hose, in accordance with the pressure conditions being applied against the partition diaphragm. The embodiments of the compound hose are suited for use in a so-called "frost-free" water system, where the water transfer feeder line is subject to freeze-up, due to low temperature ambient conditions, where temperatures even below zero Fahrenheit may be experienced. The compound hose is emptied of water, when not actively engaged in transferring water, or other liquid subject to solidification at the ambient temperature.

Further embodiments of the invention include adaptor means for attachment to the outside of the hose, to give sealed access to the air (or gas) receiving compartment, to which a compressed gas service may be connected. Such an adaptor can serve both phases of system operation i.e. to apply compressed gas or vacuum to the pipeline.

One such adaptor is similar to the body portion of the Shrader (Trademark) automotive tire, valve, where both rapid inlet and rapid outlet (exhaustion) or air is required. In accordance with the present invention a system having a gas compressor serving as the sole driving agency may be used in combination with either type of the two compound hoses.

A further aspect of the compound line of the present invention in the operation thereof as a liquid pump, in cooperation solely with an air or other gas compressor and a control circuit involves its use as a multi-plex pump, wherein two or more parallel lines working in out-of-phase relation provide more constant delivery.

The effectiveness of such a gas-driven pumping system may be optimized by setting the controls for the respective durations of the liquid induction and discharge phases of each line, so as to achieve sensibly optimum filling and emptying of the liquid transfer hose portion in substantially minimum times.

The operational efficiency of the system may be significantly improved by arranging the air flow controls so that upon commencement of a pumping cycle the pressure air within the line annulus in released into the compressor inlet in driving relation with the compressor, and the compressor then is switched on, to carry out its required servicing of the vacuum and air pressure tanks. This energy recuperation can significantly enhance system operating efficiency. It also may enable the use of smaller size system components such as the compressor and its prime-mover.

The gas flow control arrangements, in the case of a system such as a cottage water supply with a pressure tank, require an over-ride, to empty all lines of their liquid content upon the cessation of pumping, in order to prevent line freezing. It will be understood that in hot climates, the system may also be employed to minimize undesired solar heating of incoming water, by emptying the line when not actively pumping.

An electrical, hydraulic or pneumatic control system may be used. The control system may incorporate a thermostatic enabling switch, to activate the system water-purging state when conditions such as the occurrence of ambient freezing warrants its use.

In the case of a two-pipe line system, this system may be operated using an existing rigid pipe, such as a metal pipe of adequate inner diameter to receive an inner hose in threaded relation therethrough. The required connections are then provided by way of an interconnector between the flanged piping runs, for sealing off the annular air spaces about the inner hose, and the admission of pressure gas within the interstitial space, formed between the innerhose and the outer pipe, to collapse the inner hose.

BRIEF DESCRIPTION OF THE DRAWINGS

Certain embodiments of the present invention are described, by way of illustration, without being limited thereto other than as set forth in the accompanying claims, reference being made to the accompanying drawings, wherein:

DETAILED DESCRIPTION OF THE INVENTION

Figure 1:
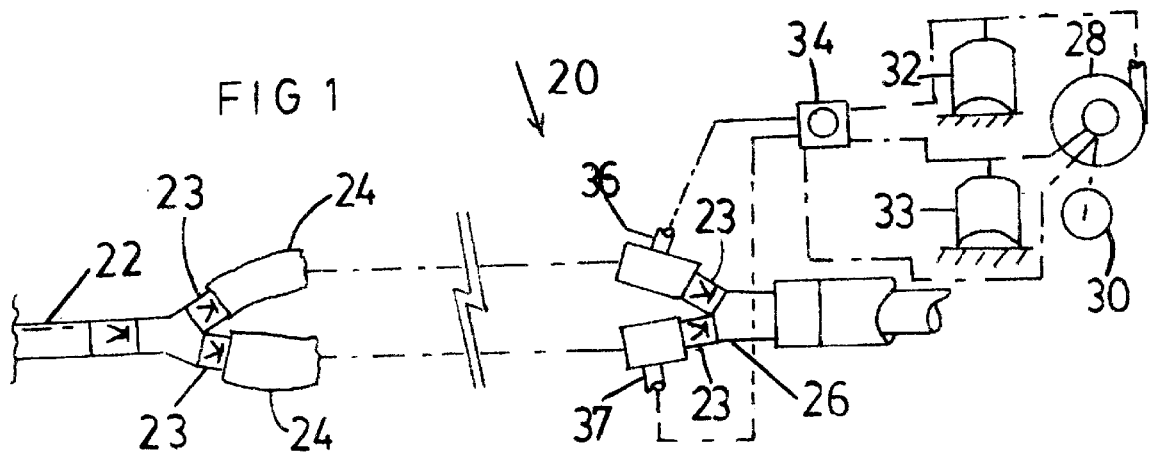
FIG. 1 is a schematic view of a duplex, air-driven pumping system.

Referring to FIG. 1, a schematic of a duplex air-driven pumping system 20 is shown, as an example of a multi-plex, parallel pumping arrangement to promote more continuous discharge. The system 20 has an intake line 22. A pair of compound lines 24 are connected in parallel flow relation to a Y-outlet 26. Each line 24 is isolated by two non-return valves 23. An air compressor 28 is shown, being driven by an electric motor 30, to charge air bottle 32 and to evacuate air bottle 33. A programmed control valve 34 connects the bottles 32, 22 in air pressure or vacuum connected relation with gas flow connectors 36, 37 of the lines 24. The liquid transfer system in accordance with the present invention, may be a domestic water supply located within a heated building (not shown).

In operation of the duplex pumping system 20, the three sequential phases of operation for the two parallel connected lines 24 are as follows:

Commencing with the system in its third, dewatered phase, wherein the inner hose portions 50 (see FIG. 2) of both lines 24 of FIG. 1 are collapsed, the first, filling phase takes place.

In the first phase, a filling operation, the control valve 34 is actuated to connect the flow connector 36 of a first one of the lines 24 to the vacuum (evacuated) air bottle 33, to draw air from, and evacuate the interstitial zone of that line 24. This expands the collapsed inner hose portion 50 of that line 24, thus drawing water from the intake line 22, through the interposed non-return valve 23, to substantially fill the inner hose 50 of the first line 24. In the second phase discharge operation, programmed actuation of the control valve 34 isolates the evacuated bottle 33 from the first line flow connector 36, and connects that flow connector 36 to the charged air bottle 32. This admits air into the previously evacuated interstitial zone, compressing the water-filled inner hose 50. The four non-return valves 23 of the two lines 24 permit water discharge solely into the discharge outlet 26, as the inner hose 50 collapses under the pressure.

The first and second phases are repetitive, under continuing actuation of the control valve 34, thereby producing intermittent flows through that branch 24. Meanwhile, operation of the control valve 34 upon the second line 24 is opposite in phase to that of the first branch, described above.

Thus, during first phase operation of the first line 24, the second line 24 is subject by control valve 34 to a second phase action, and vice versa, thereby producing complementary intermittent flows to the outlet 26, for a substantially continuous total flow throughput. When the ultimate delivery container or point is full, for example such as a water tank, the back-pressure thus created may be utilized to switch the control valve 34 to its third, de-watering phase. In the third phase the control valve 34 connects the flow connectors 36 of both lines 24 to the charge air bottle 32. This collapses both of the inner hoses 50, to de-water the lines 24 of the system.

The system remains in a de-watered condition until pumping is recommenced, with a first phase operation as detailed above.

Figure 2:
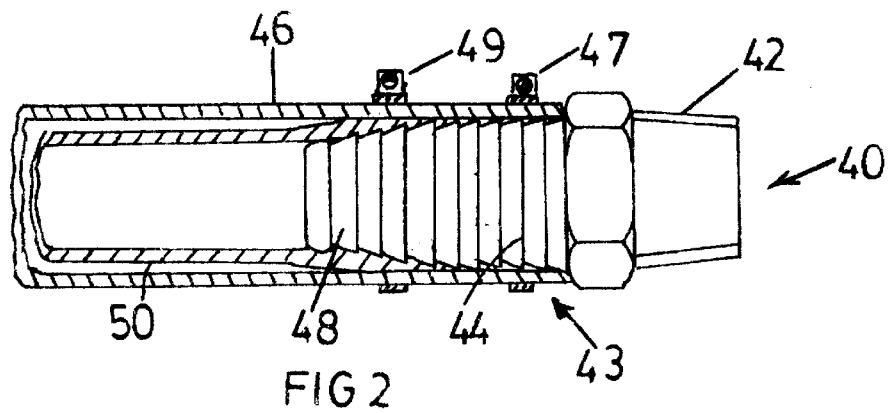
FIG. 2 is an enlarged side view in partial section of an end connector embodiment; and, FIG. 3 shows an end fitting/adapter for use with a flanged pipe system.

Referring to FIG. 2, it will be seen that connector 40 has a tapered pipe thread portion 42 on its outer end; an adjoining portion 43 has ribbed serrations 44 over which the outer hose 46 is secured in sealing relation by way of a clamp 47. A taper reduced portion 48 of the fitting 40 has ribbed serrations to receive the inner hose 50 in sealed, liquid conducting relation therewith. The outer hose 46 compresses the wall of the inner hose 50 to hermetically seal the annular air space, which is secured by a second clamp 49. The inside "nose" of the connector 40 is finished with a fine smooth surface finish, and is radiused, so as to minimize the stressing of the inner hose 50 when it is collapsed about the smooth nose, in its de-watered, purged condition.

This accomodation has been found to substantially overcome the tensile failure previously present in the inner hose of the Gauthier system. An automotive-type valve housing connecting through the outer hose 46 permits of rapid two-way gas flow into the interstitial zone between outer hose 46 and the inner hose 50.

Figure 3:
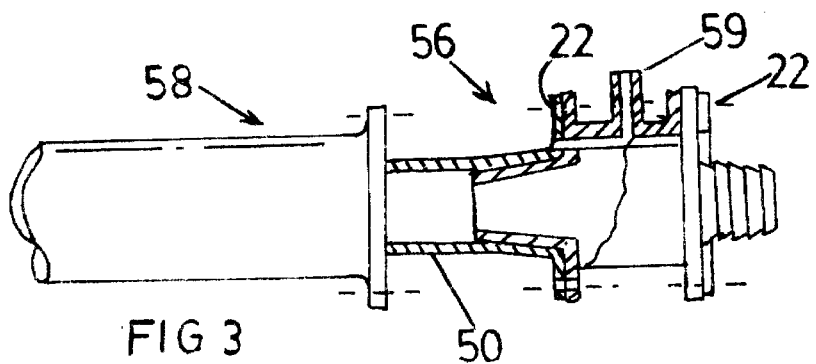

Preferring to FIG. 3, an adaptor 56 is provided for connection between a pair of flanged pipes 58, only one of which is shown, in spaced apart, disassembled relation from the adaptor 56.

The pipes 58, may form a part of a pre-existing pipe system, used, for example, for the passage of hot product that is subject to solidification in the line, upon cooling. An elastomeric inner hose 50 is located within the pipes 58, and an air supply 59 connected to the annular air spaces on both sides of the adaptor 56.

It will of course be understood that the present invention has been described above by way of example, and modifications of detail can be made within the scope of the invention, as defined in the appended claims.

What we claim by Letters Patent of the United States is:

1. A liquid transfer system, connecting a liquid source to a liquid delivery point, the system comprising: at least one pipeline of extended length having an outer line and a flexible inner hose, providing, in use, a unitary, unobstructed flowpath, and forming with the outer line an unobstructed intermediate interstitial zone along substantially the full length of the inner hose; a check valve located adjacent each end of the inner hose to ensure uni-directional liquid flow within the inner hose from said liquid source to said delivery point; programmed gas flow control valve means; gas pressurizing means to provide a source of vacuum and pressurized gas connected to said interstitial zone by way of said gas flow control valve means, to selectively provide a source of gas under pressure and a source of vacuum to said interstitial zone; said gas flow control valve means having three phases of operation; a first said phase wherein, in use, said vacuum source is connected to said interstitial zone, to evacuate gas from the zone and to expand said inner hose, to thereby induce flow of said liquid from said liquid source to substantially fill at least a major portion of the expanded said inner hose; a second said control valve phase wherein said gas pressure source is connected to said interstitial zone, to admit gas under pressure to compress and flatten said inner hose and expel all of said induced liquid toward said point of delivery, said control valve means being programmed to sequentially repeat said first and second phases, to provide delivery of a substantial quantity of said liquid and upon termination of a said second phase to enter a third phase, wherein said gas pressure is maintained within said interstitial zone to terminate said liquid transfer and maintain said inner hose fully compressed and flattened and substantially free of said liquid.

2. The system as set forth in claim 1, including a second said pipeline adjoining said at least one pipeline, to transfer said liquid from said source to said delivery point; said second pipeline including a second said inner hose having two said check valves therein located adjacent the ends thereof, a second said outer hose and a second said interstitial space; said gas pressurizing means being connected to said second interstitial space by way of said gas flow control valve means; said gas flow control valve means being programmed for sequentially applying vacuum and gas pressure to said second interstitial space in oppositely phased relation to said first pipeline for said first and second phase of operation; said third phase of operation when applied acting concurrently on said first and said second pipelines.

3. The system as set forth in claim 2, said gas pressurizing means comprising a prime mover connected in driving relation with a gas compressor, said gas compressor having a gas inlet and a gas outlet; said gas flow control valve means connecting said interstitial space to said inlet of said gas compressor just prior to the starting of said prime-mover, in use to admit said pressurized gas from said interstitial space to said gas inlet in driving relation with said gas compressor and said prime mover, to assist said prime mover in start-up thereof when providing said first and second phases of system operation.

4. The system as set forth in claim 2, wherein said gas is air.

5. The system as set forth in claim 2, wherein said gas is air.

6. The system as set forth in claim 1, said gas pressurizing means including at least one pressure tank to contain said gas at a pressure other than atmospheric.

7. The system as set forth in claim 6 having two said pressure tanks, one containing said gas at pressures above atmospheric, the other to contain said gas at pressures below atmospheric.

8. The system as set forth in claim 7, wherein said gas is air.

9. The system as set forth in claim 6, wherein said gas is air.

10. The system as set forth in claim 1, wherein said gas is air.

* * * * *